April 29, 1969  A. HANNARD  3,440,855
MACHINE TO UNFOLD THE WINDING COILS OF ELECTRICAL MACHINES
Filed Sept. 6, 1966  Sheet 1 of 2

INVENTOR
André HANNARD
BY

ATTORNEY

April 29, 1969  A. HANNARD  3,440,855
MACHINE TO UNFOLD THE WINDING COILS OF ELECTRICAL MACHINES
Filed Sept. 6, 1966

INVENTOR
André HANNARD
BY

ATTORNEY

United States Patent Office 3,440,855
Patented Apr. 29, 1969

3,440,855
MACHINE TO UNFOLD THE WINDING COILS OF ELECTRICAL MACHINES
Andre Hannard, Mont-sur-Marchienne, Belgium, assignor to Ateliers de Constructions Electriques de Charleroi (ACEC) Societe Anonyme, Charleroi, Belgium
Filed Sept. 6, 1966, Ser. No. 577,507
Claims priority, application Belgium, Sept. 9, 1965, 669,276
Int. Cl. B21d *11/02;* B21j *9/18, 13/08*
U.S. Cl. 72—296        3 Claims

ABSTRACT OF THE DISCLOSURE

This disclosure relates to a receptacle for holding the straight portion of a coil jig to be spread in a machine for forming winding coils for use in electrical machines. The receptacle is a gripper comprising a support to which is secured to an element having a flat surface serving as an abutment for one of the wide faces of the jig portion to be gripped, a first member movable perpendicularly to said flat surface and having a flat end contiguous to and retractable in relation to the said flat surface and adapted to receive one of the narrow faces of the coil jig to be gripped, and a second member movable along a plane inclined in relation to the flat surface of the element secured to the support, the end of this second member having the shape of the dihedron and serving to compress the remaining two sides of the portion to be gripped.

---

The present invention relates to hydraulically or pneumatically controlled machines used for spreading and forming winding coils for electrical machines starting from jigs.

Machines of this type are known wherein the jig to be spread is held on the straight part of its two sides in receptacles that consist of U-shaped casings to which is applied to mutual spreading motion followed or accompanied by a rotation of a certain angle in opposite direction from one another. These machines require a large number of interchangeable casings to meet the various needs that are encountered, resulting in a voluminous stocking. These casings must furthermore be closed at each operation by means of strips, the securement and the removal of which require a certain time thus reducing the rate of production.

The machine of the invention, as compared to known machines, constitutes an important improvement in that it only necessitates the stocking of small interchangeable parts and in that it affords a rate of production which is much higher because of the fact that the jigs are retained by pneumatically controlled holding members.

The machine according to the invention is characteriszed in that the receptacles for holding the straight portions of the jigs are constituted, on each side thereof, by two grippers adapted to grip the ends of the corresponding straight portion, the spacing between the grippers being adjustable. Each gripper comprises a support over which a part is secured has a flat surface that serves as abutment for one of the wide faces of the jig portion to be gripped, a first member movable perpendicularly to said surface having a flat end contigous to and retractable in relation to the said flat surface and adapted to receive one of the narrow faces of the jig portion to be gripped, and a second member movable along a plane inclined in relation to the flat surface of the part secured to the support, the end of this second member having the shape of the dihedron and serving to compress the remaining two sides of the portion to be gripped, the movable members being controlled by the pistons of pneumatic cylinders.

The description that follows and the appended drawings relate to a particular embodiment of a machine according to the invention. In the drawings.

Figure 1:
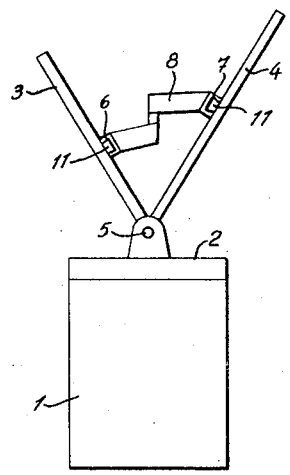
FIGURES 1 and 2 are side and front schematic views, respectively, of a machine for spreading jigs.
Figure 2:
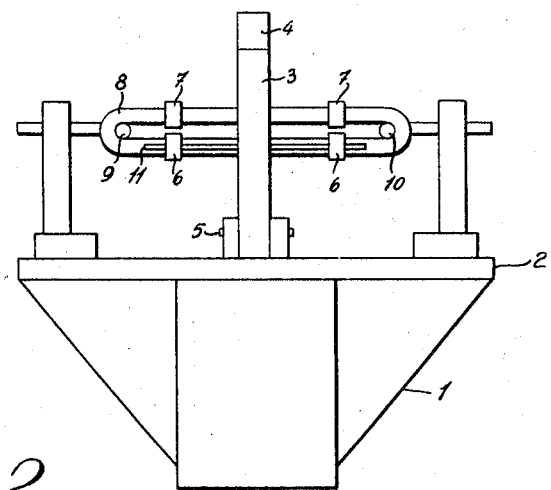

In FIGURES 1 and 2, the machine for spreading jigs comprises a frame 1 having a horizontal table 2 supporting two arms 3 and 4 capable of pivoting about an axle 5, symmetrically in relation to a vertical plane through said axle 5, and receptacles 6 and 7 adapted to hold the straight portions of the jig 8 to be spread. Receptacles 6 and 7 are movable horizontally on slide-bars 11 which are secured to arms 3 and 4. Such arrangements are known in the art and may be found, for example, in U.S. Patent No. 1437,887 issued Dec. 5, 1922. The end loops of the jig 8 are held by prongs 9 and 10, the support of which can slide along the longitudinal axis of the jig. The receptacles 6 and 7 are each constituted by two grippers such as shown in FIGURE 3 and the spacing of which can be adjusted by displacement of the grippers along a supporting slide-bar 11.

Figure 3:
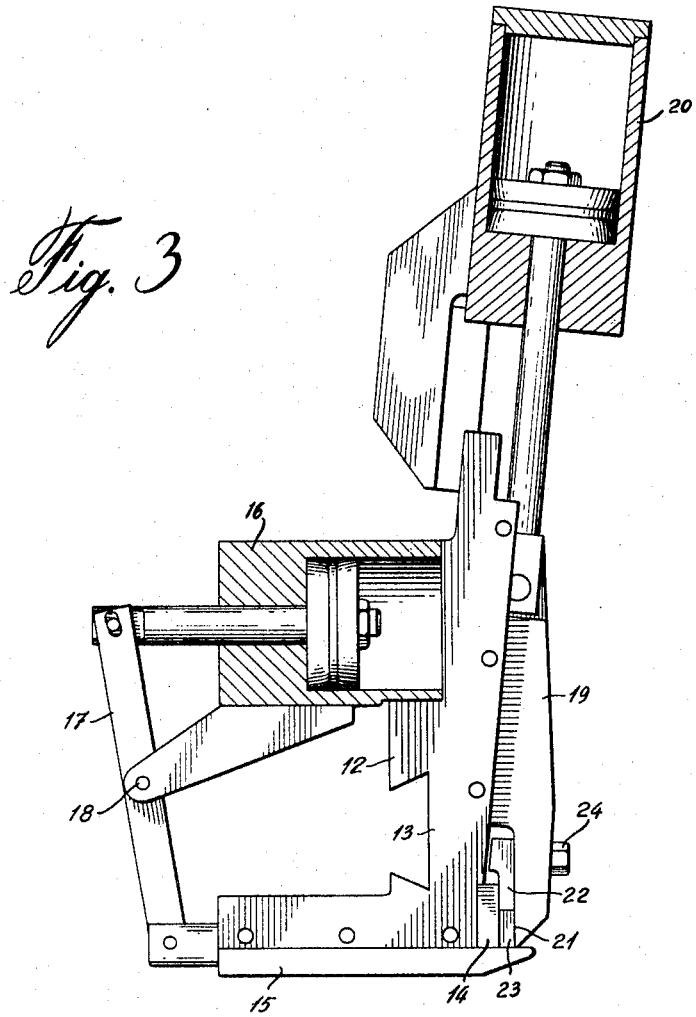
FIGURE 3 is a side elevation view, partially in cross-section, of a gripper according to the invention.

The gripper as illustrated in FIGURE 3 comprises a support 12 having a dovetail groove 13 for cooperation with slide-bar 11 schematically shown in FIGURE 2. On support 12 is secured a removable parallelpiped block or element 14 as by means of countersunk screws, for instance. A first movable member 15 can be displaced in a slide solid with the support 12 perpendicularly to the wide side of the cross-section of element 14 under the action of a pneumatic cylinder 16 solid with support 12 through a lever 17 articulated about an axle 18. A second movable member 19 may, on the other hand, slide on support 12 according to a plane which is inclined in relation to that of a wide outer face of element 14 under the action of the piston of a pneumaic cylinder 20 also secured to the support 12. The movable member 19, as well as the movable member 15, has a rounded end and a notch, the inner face 21 of which is parallel to the element 14 and within which is fixed a removable part 22 the parallelepiped end of which is also parallel to element 14. In the position illustrated in FIGURE 3, the pistons 16 and 20 are at the ends of the cylinders and the element 14 defines with the ends of the movable members 15 and 19 and the part 22 secured to the latter, a hollow parallelpipe spaced 23 adapted to receive the part to be gripped by the jig to be spread.

When the pistons are at the other end of the cylinders 16 and 20, space 23 is completely opened, so that the wide face of the part of the jig to be gripped can be applied against the outer surface of element 14; movable member 15 is actuated by allowing pressure in the cylinder 16 and finally movable member 19 by cylinder 20. Because of the inclined displacement of member 19, the jig is compressed simultaneously on its narrow face, by part 22 and on its wide face, by the inner surface 21 of the end of member 19 until the latter reaches its final position. The rounded ends of members 15 and 19 prevent damage to the insulation of the winding during this operation. The surfaces subjected to friction, particularly surface 21, are advantageously made of friction-resisting material.

The removable parts 14 and 22 may be replaced by others having dimensions appropriate to the jigs to be spread. These parts of small sizes, may easily be put away in a cabinet incorporated in the machine; the same part 22 may, besides, be used for various heights by providing holes through member 19 for the passage of securing screws 24.

It is to be understood that various modifications may be made to the spreading machine described above without departing from the spirit of the present invention.

I claim:

1. In a machine for spreading winding coils of electrical machines and including means for spreading a coil jig held along two straight portions therein in receptacles to which a mutual spreading movement is applied follower or accompanied by a rotation of a certain angle in reverse relative to one another and wherein said receptacles are grippers, two of which being provided a predetermined adjustable distance apart on each side of said coil jig to grip the ends of said straight portions, each gripper comprising:
   (a) a support;
   (b) an element fixed to said support and having a flat surface to serve as abutment for one of the faces of the coil jig to be gripped;
   (c) a first member having a flat end contiguous with said flat surface;
   (d) means to move said flat end perpendicularly to said abutment surface;
   (e) a second member having an end in the shape of a dihedron;
   (f) means to move said dihedron end along a plane inclined in relation to said flat surface of said element fixed to said support, whereby said second member may compress the sides of said coil jig opposite the sides abutting said flat surface of said fixed element and said flat end of said first member.

2. A machine as claimed in claim 1, wherein said element is removably fixed to said support and said dihedron end also comprises a part removably fixed to said second member.

3. A machine as claimed in claim 1, wherein said first member flat end and said second member dihedron end have a rounded extremity to prevent damage to said coil jig.

References Cited

UNITED STATES PATENTS

| 186,999 | 2/1877 | French | 72—400 |
| 3,142,329 | 7/1964 | Tribe | 72—453 |
| 3,209,577 | 10/1965 | Teplow | 72—453 |

CHARLES W. LANHAM, *Primary Examiner.*

G. P. CROSBY, *Assistant Examiner.*

U.S. Cl. X.R.

72—453, 457